United States Patent [19]

Connell et al.

[11] Patent Number: 4,511,544
[45] Date of Patent: Apr. 16, 1985

[54] HYDROGEN SULFIDE REMOVAL PROCESS

[75] Inventors: David E. Connell, El Sobrante; Colin M. Chapman, Rodeo, both of Calif.

[73] Assignee: Chevron Research Company, San Francisco, Calif.

[21] Appl. No.: 537,859

[22] Filed: Sep. 30, 1983

[51] Int. Cl.³ .............................................. B01D 53/34
[52] U.S. Cl. ..................................... 423/224; 423/210; 423/226; 423/573 R; 261/DIG. 54
[58] Field of Search ............... 423/220, 224, 226, 210, 423/573 R, 573 G, 242 R; 261/DIG. 54

[56] References Cited

U.S. PATENT DOCUMENTS

| | | | |
|---|---|---|---|
| 2,256,374 | 9/1941 | Cummings, Jr. | 55/257 X |
| 2,997,439 | 8/1961 | Nicklin et al. | 423/573 X |
| 3,097,926 | 7/1963 | Nicklin et al. | 423/573 |
| 3,172,725 | 3/1965 | Rugh | 261/DIG. 54 |
| 3,618,908 | 11/1971 | Stone | 261/62 |
| 3,815,332 | 6/1974 | Bobrowsky | 261/DIG. 54 |
| 4,005,999 | 2/1977 | Carlson | 261/DIG. 54 |
| 4,125,597 | 11/1978 | Fleck | 423/573 R |
| 4,334,897 | 6/1982 | Brady et al. | 55/257 PV |

Primary Examiner—Earl C. Thomas
Attorney, Agent, or Firm—Burns, Doane, Swecker & Mathis

[57] ABSTRACT

A Stretford process for removing hydrogen sulfide collects a horizontal pool of liquid downstream of the primary gas/liquid contactor and accelerates a multiphase flow along the surface of that pool and along a serpentine path. Additional gas-liquid contact is effected by the interaction of multiphase flow and structural components establishing the pool and causing the acceleration.

8 Claims, 1 Drawing Figure

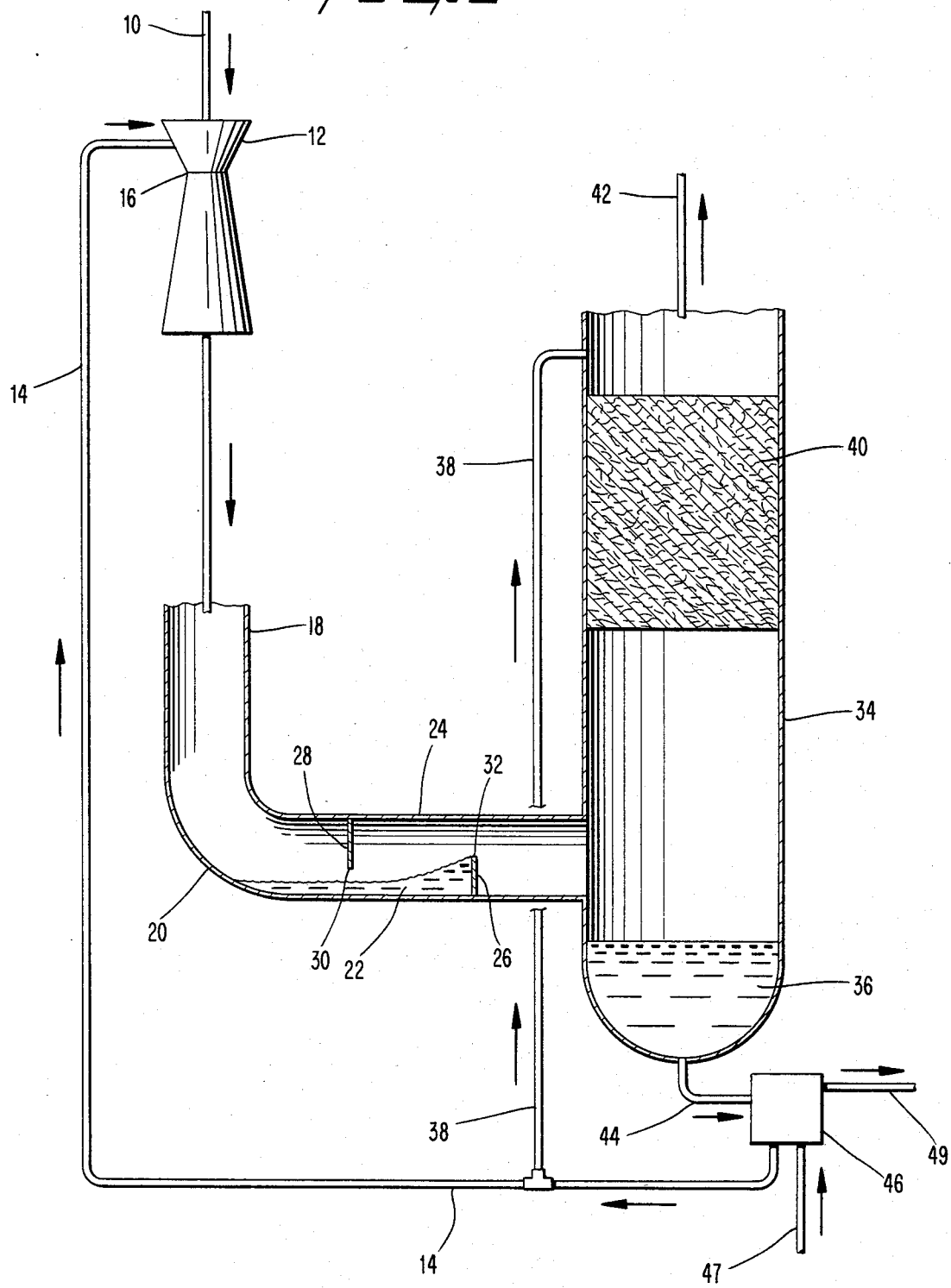

HYDROGEN SULFIDE REMOVAL PROCESS

BACKGROUND OF THE INVENTION

The present invention relates generally to the Stretford process for removing a hydrogen sulfide constituent from a gas stream and recovering elemental sulfur as a by-product. More particularly, the present invention concerns an improvement to the gas/liquid contacting step by which the Stretford solution is exposed to the gas stream for reaction with the hydrogen sulfide constituent.

Hydrogen sulfide is a noxious gas which is commonly found in considerable concentrations in sour natural gas and in tail gases from petroleum refineries. The noxiousness of hydrogen sulfide is manifested in a number of ways. For example, an offensive odor is detectable when hydrogen sulfide is present in quantities as low as 0.13 ppm by volume. In addition, a mixture of hydrogen sulfide and air is explosive when the hydrogen sulfide is present in concentrations as low as 4.4 volume percent. Moreover, hydrogen sulfide is a dangerous mammalian poison.

The noxious character of hydrogen sulfide has led to state and federal laws and regulations that severely restrict the quantities of hydrogen sulfide which may be permissibly exhausted into the atmosphere. In at least partial response to these regulations, numerous processes have been developed to remove hydrogen sulfide from residue gases as well as from otherwise useful products such as natural gas. One of the prominent processes in the petroleum industry for effecting the hydrogen sulfide removal is known as the Stretford process. The Stretford process is generally described in three United States patents issued to T. Nicklin et al, U.S. Pat. No. 2,997,439 issued Aug. 21, 1961; U.S. Pat. No. 3,035,889 issued May 22, 1962; and U.S. Pat. No. 3,097,926 issued July 16, 1963.

According to the Stretford process, gaseous hydrogen sulfide is reacted with a solution containing anthraquinone disulphonic acid and an aqueous alkaline solution containing ortho-, meta- and pyro-vanadates of ammonia and alkali metals and a salt of iron, copper, manganese, chromium, nickel, or cobalt. The gaseous hydrogen sulfide, which may be only one constituent of a mixture of gases, is then exposed to the Stretford solution where the reaction occurs. In the reaction, hydrogen sulfide is oxidized by the Stretford solution to elemental sulfur and the solution is reduced. Then air, or an oxygen containing gas, bubbles through the reduced Stretford solution to regenerate that solution by oxidizing it. Subsequently, sulfur is separated from the Stretford solution and the solution is recirculated in the process. Regeneration of the Stretford solution and separation of the elemental sulfur from the Stretford solution typically take place with a flotation cell.

In the typical Stretford process apparatus, the gas/liquid contacting step occurs in a scrubber using a venturi section. As the gas containing hydrogen sulfide passes through the venturi, the Stretford solution is sprayed into the gas stream in the form of fine droplets. The chemical reaction discussed above occurs across the surface area of these droplets as they flow downstream along with the gas flow. Generally, the gas-liquid contact occurs with the gas phase and liquid phase moving, in a co-flowing relationship. Thus, a multi-phase flow of gas, liquid are solid particles (sulfur) leaves the venturi discharge.

In conventional Stretford process systems, the multi-phase flow from the venturi moves vertically downwardly and passes through a conduit that first turns the flow to a generally horizontal direction and then discharges the flow into the bottom of an absorbing column. The liquid and solid phases of the multi-phase flow are generally separated by centrifugal and gravitational forces as the gas phase decelerates into the large volume absorber column and turns to move vertically upwardly through the absorber column. A second gas/liquid contact occurs in the absorbing column where additional Stretford solution passes in counterflow relationship with the gas stream through the absorber column media and drops to the bottom of the absorbing column.

It has also been known to provide a short vertically extending dam in the bottom of the horizontal portion of the conduit between the venturi discharge and the absorber column in a Stretford process. This short dam has been employed for the purpose of retaining a shallow pool of the Stretford solution which backs up toward the elbow provided in the conduit. This retained pool of Stretford solution provides some protection to the elbow against the corrosive and erosive effects of the liquid, gas and solid particles passing therethrough.

In other processes and apparatus for gas scrubbing, it is known to provide baffles for generating turbulence in a gas flow into which liquid is sprayed. U.S. Pat. No. 4,334,897, issued June 15, 1982 to Brady et al (sulphur dioxide). In other gas scrubbers baffles direct a gas stream as it moves across the surface of a liquid reservoir. U.S. Pat. No. 2,256,374, issued Sept. 16, 1941 to Cummings, Jr. (air humidified by water); U.S. Pat. No. 3,172,725 issued Mar. 9, 1965 to Rugh (sulfur trioxide removed from air by sulfuric acid solution); U.S. Pat. No. 3,815,332 issued June 11, 1974 to Babrowsky et al (solids removed from gas by water); and U.S. Pat. No. 4,005,999 issued Feb. 1, 1977 to Carlson (particulate pollutant removed from industrial process effluent by a cleansing liquid).

It is preferred that primary gas/liquid contct occur upstream of the absorber column. This result is desirable because the small passages of the absorber column become clogged if large quantities of elemental sulfur occur therein. Generally speaking, as much as 95% to 98% of the sulfur should be removed from the gas before it enters the bottom of the absorbing column. This high level of sulfur removed in the venturi scrubber is needed since the elemental sulfur agglomerates in particles having sizes ranging from submicron dimensions to 100 microns. Particles of such size could plug the packing in the absorber column but, due to the openness of the venturi and downstream conduit, these can be easily handled by the venturi scrubber.

When the Stretford process is scaled up for large plant capacities, the venturi of the scrubber may require a throat diameter in excess of two feet and a very large flow rate of Stretford solution. It has been observed that inadequate gas/liquid contact occurs in the scrubber and venturi section in large sized venturis. Moreover, it has been observed that with a large venturi and a high liquid mass flow rate, as little as 65% of the desired sulfur removal occurs in the scrubbing step. While various theories have been advanced to explain this deficiency, it is clear that the need continues to exist for an improvement to the Stretford process which overcomes these problems.

SUMMARY OF THE INVENTION

The improvement to the Stretford process in accordance with the present invention involves providing at least one additional baffle spaced upstream from an overflow baffle by a distance sufficient to provide a serpentine flow path between the baffles. The upstream baffle has a horizontal edge beneath which the multiphase flow from the venturi discharge must pass. That flow is accelerated beneath the edge of the upstream underflow baffle and the free surface of the liquid pool positioned therebelow. During that acceleration and direction change, some liquid and solid phase is separated by impacting the baffle while a portion of the gas phase is sheared along the surface of the liquid pool to obtain additional gas/liquid contact. Momentum of the multiphase flow passing under the overflow baffle also causes portions of the liquid pool to spray over the edge of the downstream overflow baffle. Accordingly, the multiphase flow has additional contact with the liquid as it passes through the spray from the overflow baffle.

To suitably accelerate the multiphase flow, the underflow baffle should provide an area restriction in the conduit corresponding to a baffle height of ¼ to ¾ of the conduit internal diameter. This baffle height provides a restriction of approximately 20–80% of the conduit cross section which restriction is further increased by the presence of the pool of liquid retained by the overflow baffle downstream of the underflow baffle.

One or more additional pairs of underflow baffles with downstream overflow baffles may be provided between the venturi discharge and the absorbing column to further enhance the gas liquid contact upstream of the absorbing column.

BRIEF DESCRIPTION OF THE DRAWING

Many objects and advantages of the present invention will be apparent to those skilled in the art when this specification is read in conjunction with the attached drawing wherein like reference numerals are applied to like elements and wherein:

FIG. 1 is a schematic view of a Stretford process with gas/liquid contact according to this invention.

DESCRIPTION OF THE PREFERRED EMBODIMENT

A gas stream (see FIG. 1) containing a hydrogen sulfide constituent flows vertically downwardly through a conduit 10 and enters the top of a scrubber 12. A typical source of the gas stream is the tail gas from a petroleum refinery or a stream of sour natural gas. A conduit 14 introduces a liquid which reacts with the hydrogen sulfide to produce elemental sulfur, such as a Stretford liquid into the scrubber 12 where it is sprayed into intimate contact with the hydrogen sulfide containing gas stream introduced to the scrubber 12 through the conduit 10. The chemical composition of the Stretford solution is generally described above.

The scrubber 12 typically includes a venturi having a throat section 16 through which the hydrogen sulfide containing gas and the Stretford liquid are accelerated. Preferably, the Stretford liquid is sprayed toward the throat of the venturi in order to induce the gas stream to flow through the venturi. The Stretford liquid and the gas stream move in cocurrent relationship as they pass vertically downwardly through the scrubber 12. Differences in momentum between the liquid droplets of the Stretford solution and the gas stream cause the gas stream to pass into contact with the Stretford solution and react therewith so as to remove hydrogen sulfide from the gas stream thereby producing a reduced Stretford solution along with elemental sulfur. Thus, as the fluid leaves the scrubber 12, the fluid has a gaseous constituent (the input gas stream), a liquid constituent (the Stretford solution), and a solid constituent (the elemental sulfur). This multiphase flow continues to move vertically downward through the conduit 18 which is attached to the bottom of the scrubber 12. As the multiphase fluid passes through the conduit 18, turbulent interaction between the Stretford liquid and the gas stream causes further reaction between the hydrogen sulfide contained in the gas stream and the Stretford liquid to generate elemental sulfur.

At the bottom of the generally vertical conduit 18, the vertical flow direction of the multiphase flow is abruptly changed to the horizontal direction by an elbow 20. This abrupt change in the flow direction causes some centrifugal separation of the liquid Stretford solution and the solid elemental sulfur from the gas stream. Accordingly, a pool 22 of liquid and suspended solids accumulates in the bottom of the horizontally extending portion 24 of the conduit 18. The pool 22 is established in large part by the presence of an overflow baffle 26 which projects vertically upwardly across the horizontally extending conduit 24. The vertical height of the horizontal edge of the overflow baffle 26 is selected to lie in the range of ¼ to ¾ of the conduit diameter 24. With this arrangement, a flow area reduction in the conduit above the baffle 26 in the range of 20–80% is attained.

Positioned upstream of the overflow baffle 26 is an underflow baffle 28. The overflow baffle 26 and the underflow baffle 28 are spaced apart by a distance that is a function of diameter of the horizontal portion of the conduit 24. If the diameter is less than about two feet, the spacing should be about one diameter; if the diameter exceeds two feet, then the baffle spacing should be two to three feet. This spacing assures a serpentine flow through the baffle region.

As the liquid multiphase flow passes the elbow 20, and enters the horizontal conduit 24, it is accelerated by the area restriction created by the underflow baffle 28. The underflow baffle 28 has a generally horizontally extending free edge 30. The underflow baffle extends down ¼ to ¾ of the diameter of the horizontal conduit 24. The underflow baffle 28 also provides an impingement surface for some of those droplets of liquid Stretford solution and particles of elemental sulfur which are not centrifugally separated as the multiphase flow turns the corner defined by the elbow 20. Accordingly, the Stretford droplets which impinge upon the underflow baffle 28 flow downwardly along the face of the underflow baffle 28 and drop from the horizontal edge 30 toward the pool 22.

Moreover, as the multiphase fluid passes beneath the underflow baffle 28 momentum transfer between the multiphase flow and the liquid pool 22 causes an accumulation of the pool 22 behind the overflow baffle 26. Moreover, the gaseous phase of the multiphase flow is positioned closely adjacent the pool to enhance reaction of the hydrogen sulfide constituent.

As the Stretford solution in the pool 22 reaches the top edge 32 of the overflow baffle 26, it generally breaks into a spray of droplets. Accordingly, as the multiphae flow passes beneath the underflow baffle 28 and above the overflow baffle 26, it experiences repeated acceleration and deceleration and simultaneously encounters a cross flow of Stretford liquid. Accordingly, the spaced underflow and overflow baffles provide additional gas/liquid contact in the Stretford process before the multiphase fluid reaches the absorbing column 34.

In the absorbing column 34 the gas phase turns and flows vertically upward. At the same time, the liquid Stretford solution along with the separated elemental sulfur particles are centrifugally separated from the multiphase flow and drop into the accumulation reservoir 36 at the bottom of the absorber column 34. Since the gas stream flows vertically upwardly, gravity will decelerate and further separate liquid droplets from the multiphase flow as it passes upwardly through the absorber column.

In the absorber column 34, a subsequent gas liquid contact step occurs. More particularly, a conduit 38 introduces Stretford solution into the top portion of the absorber packing 40. As the Stretford solution percolates downwardly through the absorber packing 40, in counterflow relationship with the gaseous phase of the fluid, the solution reacts with and removes any additional hydrogen sulfide from the gas stream prior to exhausting that stream through the exhaust conduit 42.

That Stretford solution introduced through the conduit 38 flows vertically downwardly under the influence of gravity through the packing 40 and drops into the reservoir 36 provided at the bottom of the absorber column 34. The liquid Stretford solution and entrained sulfur are removed from the bottom reservoir 36 of the absorber column 34 by a conduit 44 which takes the reduced Stretford solution and the entrained elemental sulfur to a solid-liquid separation chamber 46. In the solid-liquid separation chamber 46, an oxygen containing gas, such as air, may bubble upwardly through the reduced Stretford solution from conduit 47 to oxidize the Stretford solution. Oxidized Stretford solution from the chamber 46 then recirculates to the liquid conduits 14, 38 for recycling through the apparatus. Elemental sulfur is removed from the chamber 46 by the conduit 49. Sulfur may then be washed and melted or otherwise treated.

It should now be apparent to those skilled in the art that, in accordance with the present invention, an improvement has been provided for the Stretford process which overcomes problems of the type discussed above. Moreover, it will be apparent to those skilled in the art that numerous modifications, variations, substitutions, and equivalents exist for features of the invention which do not materially depart from the spirit and scope of the invention. Accordingly, all such modifications, variations, substitutions and equivalents which fall within the spirit and scope of the appended claims are expressly intended to be embraced thereby.

What is claimed is:

1. An improved process for removing hydrogen sulfide from a gas stream comprising the steps of:
   passing a gas stream containing gaseous hydrogen sulfide through a conduit;
   introducing a liquid into the gas stream passing through the conduit which reacts with the hydrogen sulfide to produce elemental sulfur;
   turning the flow of gas, liquid and elemental sulfur abruptly so that liquid and sulfur particles are partially separated from the gas;
   collecting a pool of liquid and sulfur particles with an overflow baffle;
   accelerating the gas between the edge of an underflow baffle and the free surface of the pool of liquid upstream of the overflow baffle to obtain gas/liquid contact and using gas momentum to create spray from the overflow baffle through which the gas stream also flows for additional gas/liquid contact;
   separating the gas from the liquid and elemental sulfur; and
   passing the gas through an absorber column in counterflow relationship with a second flow of the liquid for reaction with residual hydrogen sulfide.

2. The process of claim 1 wherein the gas stream passes through a venturi and the liquid is sprayed into the venturi to induce the gas stream to flow through the venturi.

3. The process of claim 1 wherein the pool of liquid and sulfur particles is collected by extending a vertical baffle into the gas stream with a height in the range of $\frac{1}{4}$ to $\frac{3}{4}$ the conduit diameter so that the gas stream accelerates over the baffle.

4. The process of claim 1 wherein the acceleration step is induced in the gas stream by projecting an underflow baffle into the gas stream toward the pool such that the underflow baffle has a depth of $\frac{1}{4}$ to $\frac{3}{4}$ the conduit diameter so that the gas stream accelerates under the baffle.

5. An improved Stretford process for removing hydrogen sulfide from a gas stream comprising the steps of:
   passing a gas stream containing gaseous hydrogen sulfide through a conduit;
   introducing a Stretford liquid into the gas stream passing through the conduit which reacts with the hydrogen sulfide to produce elemental sulfur;
   turning the flow of gas, liquid and elemental sulfur abruptly so that liquid and sulfur particles are partially separated from the gas;
   collecting a pool of liquid and sulfur particles with an overflow baffle;
   accelerating the gas between the edge of an underflow baffle and the free surface of the pool of liquid upstream of the overflow baffle to obtain gas/liquid contact and using gas momentum to create spray from the overflow baffle through which the gas stream also flows for additional gas/liquid contact;
   separating the gas from the liquid and elemental sulfur; and
   passing the gas through an absorber column in counterflow relationship with a second flow of the liquid for reaction with residual hydrogen sulfide.

6. The process of claim 5 wherein the gas stream passes through a venturi and the liquid is sprayed into the venturi to induce the gas stream to glow through the venturi.

7. The process of claim 5 wherein the pool of liquid and sulfur particles is collected by extending a vertical baffle into the gas stream with a height in the range of $\frac{1}{4}$ to $\frac{3}{4}$ the conduit diameter so that the gas stream accelerates over the baffle.

8. The process of claim 5 wherein the acceleration step is induced in the gas stream by projecting an underflow baffle into the gas stream toward the pool such that the underflow baffle has a depth of $\frac{1}{4}$ to $\frac{3}{4}$ the conduit diameter so that the gas stream accelerates under the baffle.

* * * * *